Sept. 22, 1936.  A. A. ROBINSON ET AL  2,055,263
METHOD OF COLLECTING AND DEFIBRINATING BLOOD
Filed Feb. 4, 1935
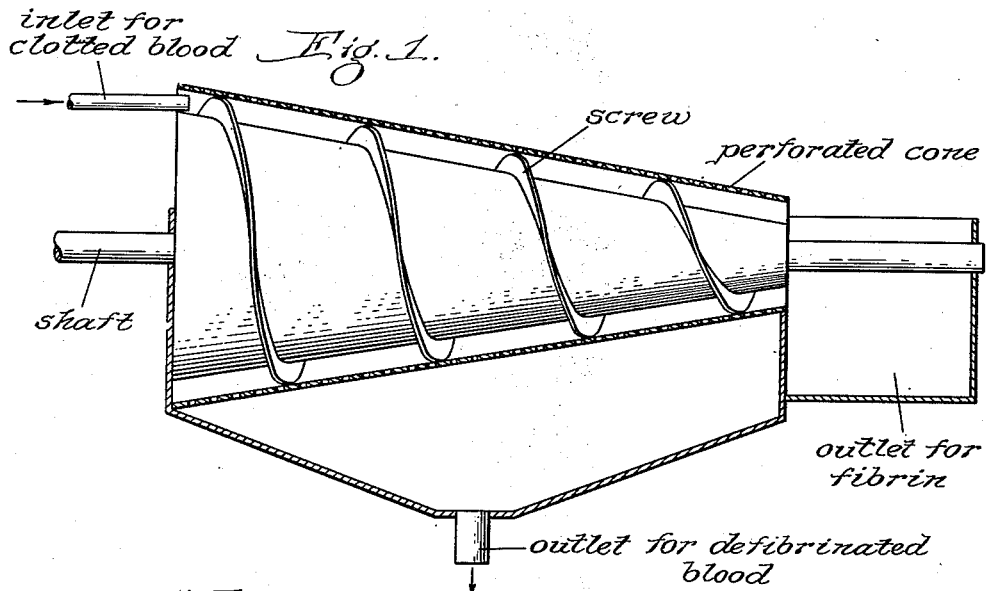
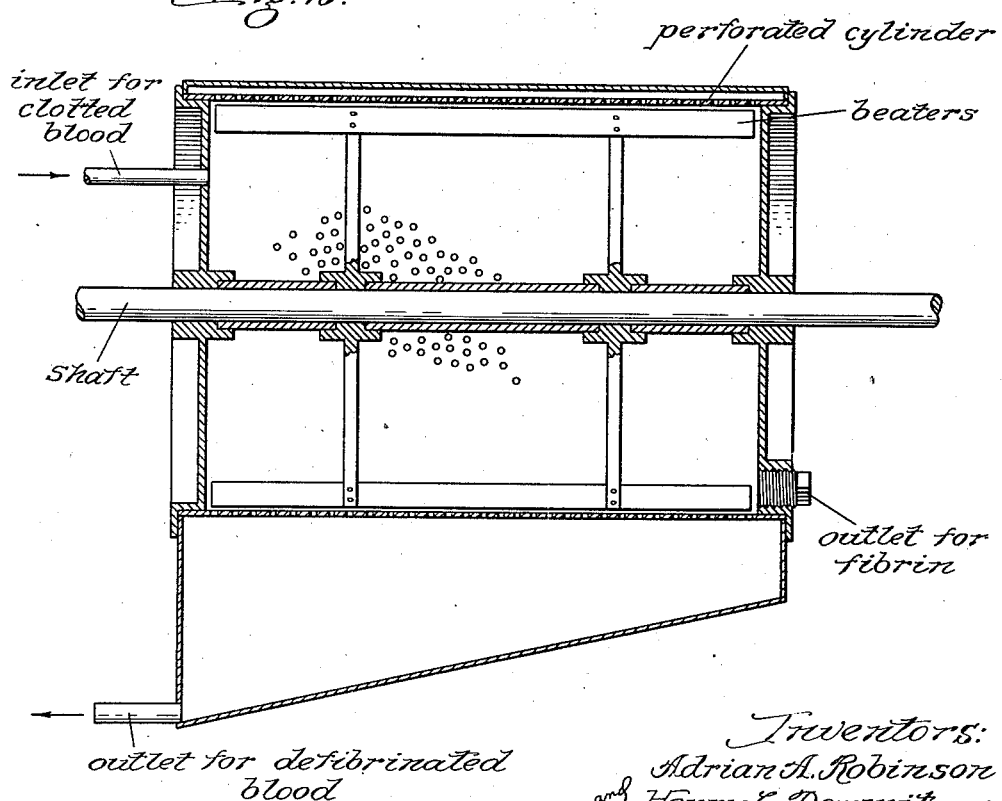
Inventors:
Adrian A. Robinson
and Henry E. Dormitzer.
By Dyrenforth, Lee, Chritton & Wiles
Attys.

Patented Sept. 22, 1936

2,055,263

UNITED STATES PATENT OFFICE 2,055,263

METHOD OF COLLECTING AND DEFIBRINATING BLOOD

Adrian A. Robinson and Henry C. Dormitzer, Chicago, Ill., assignors to Wilson & Co., Inc., a corporation of Delaware Application February 4, 1935, Serial No. 4,999

3 Claims. (Cl. 99—21)

This invention relates to a method of collecting and defibrinating blood, particularly to the blood of meat animals such as beef, sheep, and hogs, and to the product thereof.

In the present commercial stockyard practice the blood of small animals such as hogs and sheep is not collected for use as soluble blood, but is rendered insoluble and disposed of at a relatively low price as fertilizer material or animal food. Such blood as is used for dried blood purposes is collected from beef animals in a very expensive manner. The present practice is that when the beef animal is stuck, a laborer catches the blood in a pail, and the blood is then defibrinated by agitation, for example by stirring it with a bundle of sticks. Such a method is of course extremely expensive and burdensome. In such a practice it was of primary importance that the blood be defibrinated promptly so that it should have no opportunity to become coagulated.

In defibrinating in the former manner, approximately 60 to 70% of the blood is recovered in the defibrinated product, and the ratio of serum to haemoglobin is substantially the same as in the original material.

Other methods of removing the fibrin have been suggested, for example Atwood in United States Patents Nos. 1,614,337 and 1,673,964 suggests a coagulation of a peculiar type under particular controlled conditions. The expense of this method makes it entirely impracticable for ordinary use, and as explained in the Atwood patents it is desirable only where the pure serum is to be obtained free from haemoglobin.

It has now been discovered that a very great saving can be made if the blood is permitted to coagulate in the normal manner and is then defibrinated as hereinafter set forth. By proceeding in this manner it is possible to collect the blood from a plurality of animals in a sump, thereby avoiding the disagreeable and expensive method of holding individual pails to the necks of the dying animals. It is also possible to collect hogs', calves' and sheep's blood for soluble blood economically.

In accordance with this invention the blood is collected in a sump, where it is allowed to coagulate, if it has not already done so. During the coagulation all of the fibrinogen is changed to fibrin, which encloses the serum and haemoglobin constituents in the normal clot. Following coagulation, the clotted material which is still flowable, may be pumped into containers, and then run through suitable fibrin-separating means.

Such means are illustrated diagrammatically in the drawing in which Figure 1 is a diagrammatic sectional elevation of a screw type of defibrinator, and Figure 2 is a similar view of a beater type.

One of the difficulties in connection with separating the fibrin from the coagulated blood has been to carry out the separation without rupture or laking of the blood cells, with consequent liberation of a haemoglobin content. It has now been discovered that all of the blood cells may be separated from the fibrin without substantial laking or rupture.

Another difficulty heretofore presented is the tremendous clogging power of the coagulated blood. Screens having extremely large openings, for example as large as one inch, have been known to clog very rapidly when clotted blood has been passed through them.

It has been discovered however that by the use of a combined screening and pressing action, in which the screen is constantly scraped free from the separated fibrinogen, that a very satisfactory separation can be accomplished.

In practice it has proved advantageous not to attempt an entire separation, but to stop the process when about 65% of the blood has been recovered. In this manner the fibrin is retained in a sufficiently fluid condition so that it is readily removed from the screen, and likewise the blood product is relatively free from fibrin which might be forced through the screen if further attempts at separation were continued. However the separation can be carried out to a considerably greater extent if it is desired to do so.

A preferred procedure may be accomplished by passing the clotted blood through a beater type of device shown in Figure 2, and subsequently passing the product through a screw type shown in Figure 1. The beater type has a considerably greater capacity, whereas the screw type carries out a better separation. In the screw type the screw is preferably rotated at a speed of 150 R. P. M., whereas in the beater type the beaters are rotated at the rate of about 600 times per minute.

The resulting blood product is substantially free from fibrin, although it contains somewhat more than blood defibrinated before coagulation. The product contains 15 to 16% solids as against 20% solids in ordinary blood. The serum content ranges from about 65 to 75% and the haemoglobin from about 25 to 35%, as against 60% for the serum and 40% for the haemoglobin in normal blood. The normal content of the defibrinated blood will be about 70% serum and 30% haemoglobin.

In carrying out the invention it has been further discovered that it is not necessary to separate from the blood the miscellaneous impurities such as straw which collect with it. On the contrary, the presence of some fibrous materials may assist somewhat in the proper separation of the fibrin. The clots may be broken up prior to defibrination by passing through a gear pump or the like.

This application is a continuation in part of our co-pending application Serial No. 725,189 filed May 11, 1934.

The foregoing detailed description is given for clearness of understanding only, and no unnecessary limitations should be understood therefrom, but the appended claims should be construed as broadly as permissible in view of the prior art.

What we claim as new and desire to secure by Letters Patent is:

1. The method of removing fibrin from blood which comprises coagulating the blood to produce a normal blood clot, pressing the coagulated blood upon a screen, whereby defibrinated blood is pressed through the screen, and continuously removing the freed fibrin from the screen.

2. The method as set forth in claim 1, in which the fibrin is freed from approximately 65% of the contained blood.

3. The method of collecting and defibrinating blood which comprises collecting the blood from a plurality of animals in a common receptacle, coagulating the blood to produce a normal blood clot, pressing the coagulated blood upon a screen, whereby defibrinated blood is pressed through the screen, and continuously removing the freed fibrin from the screen.

ADRIAN A. ROBINSON.
HENRY C. DORMITZER.